United States Patent
Schwarz et al.

(10) Patent No.: US 6,819,979 B1
(45) Date of Patent: Nov. 16, 2004

(54) METHOD AND DEVICE FOR DETERMINING A VERTICAL ACCELERATION OF A WHEEL OF A VEHICLE

(75) Inventors: Ralf Schwarz, Heidelberg (DE); Cristlano Hoffmann, Frankfurt am Main (DE)

(73) Assignee: Continental Teves, Ag & Co. OHG, Frankfurt (DE)

( * ) Notice: Subject to any disclaimer, the term of this patent is extended or adjusted under 35 U.S.C. 154(b) by 0 days.

(21) Appl. No.: 09/913,143
(22) PCT Filed: Jan. 28, 2000
(86) PCT No.: PCT/EP00/00663
§ 371 (c)(1),
(2), (4) Date: Jan. 25, 2002
(87) PCT Pub. No.: WO00/47457
PCT Pub. Date: Aug. 17, 2000

(30) Foreign Application Priority Data

Feb. 11, 1999 (DE) .......................................... 199 05 662
Aug. 24, 1999 (DE) .......................................... 199 40 490

(51) Int. Cl.[7] .............................................. G06F 7/00
(52) U.S. Cl. ........................................................ 701/1
(58) Field of Search ............................... 701/1, 36, 37, 701/38

(56) References Cited

FOREIGN PATENT DOCUMENTS

| DE | 3518382 C1 | 4/1986 |
|---|---|---|
| DE | 41 33 666 | 4/1993 |
| DE | 196 43 651 | 4/1997 |
| DE | 198 11 350 | 10/1998 |
| EP | 0 752 330 | 1/1997 |
| EP | 0 808 733 | 11/1997 |

*Primary Examiner*—Yonel Beaulieu

(57) ABSTRACT

A method and a device for the determination of a vertical acceleration ($\ddot{z}_W$) of a wheel of a vehicle for use in a driving dynamics control or monitoring system. The device includes a first determination device for the determination of a spring stroke acceleration ($\Delta\ddot{z}$) of a spring loaded in vertical direction by the body of the vehicle and installed between the body and the wheel; a second determination device for the determination of a partial vertical body acceleration ($\ddot{z}_{B,V}$), and a control unit, which adds the spring stroke acceleration ($\Delta\ddot{z}$) and the partial vertical body acceleration ($\ddot{z}_{B,V}$) in order to obtain the vertical wheel acceleration ($z\ddot{z}_W$) and passes the vertical wheel acceleration ($\ddot{z}_W$) and passes the vertical wheel acceleration ($\ddot{z}_W$) for further processing to the driving dynamics control. By this means, an expensive sensor arrangement for the detection of the vertical wheel acceleration can be eliminated, wherein the results of the inventive determination of the vertical wheel acceleration reflect very actual comparison measurements.

11 Claims, 3 Drawing Sheets

(a)

(b)

(c)

(d)

METHOD AND DEVICE FOR DETERMINING A VERTICAL ACCELERATION OF A WHEEL OF A VEHICLE

The invention relates to a method and a device for the determination of a vertical acceleration of a wheel of a vehicle for the use in vehicle dynamics control or monitoring, which can be operated in a cost-saving manner, in particular by means of the sensory detection of only a few auxiliary quantities.

Many modern vehicle control systems and vehicle monitoring systems, respectively, which influence or monitor the horizontal or vertical vehicle dynamics, require among others the dynamic normal wheel forces as input quantities. The normal forces are those forces that act upon the wheels through the tire print on the road surface. The dynamic normal wheel forces, however, can only be determined with a significant expenditure, which is the reason for currently making simplifications in applications. However, by this means, the control quality of the control systems is significantly compromised.

Several methods for the determination of the dynamic normal wheel forces are known. In order to determine the dynamic normal forces of the wheel during driving operation, direct measuring methods with multiple-component measuring hubs (see e.g. SAE 980262 "Evaluation of Different Designs of Wheel Force Transducers") are ruled out due to the high costs for these sensors. In indirect methods, auxiliary quantities are measured, from which the dynamic normal wheel forces can be computed. For the production suitability of these methods, therefore, the expenditure for detection of these auxiliary quantities is crucial. The Braunschweig method, the Munich method, and the tire-inside-pressure method use the tire as a measuring spring, wherein the dynamic normal wheel force is computed via a characteristic curve from the vertical tire spring compression, the lateral tire expansion, or the tire inside pressure, respectively (see e.g. Gersbach et al.: "Comparison of Procedure to the Measurement of Wheel Load Variations, ATZ Periodical Technical Automobile 80, 1978; Bode: "Comparison more Differently Proceed to the Determination of the Dynamic Wheels Load", German on the Basis of Research Goes and Strove Associate Technology, No. 131, VDI-publishing house, 1959). The measurement of these quantities and the necessary telemetry are very elaborate. Additionally, the required characteristical tire curves are subject to great variations. The Hanover method (Bode, noted above) and the Darmstadt method (Svenson: Investigations of the dynamic krafte between wheel and street and its effects on the stress of the street, No. 130, VDI-publishing house, 1959) use expansion measuring strips in order to make conclusions on the dynamic normal wheel force through the expansion of the axle body or the hub bed, respectively. A method based on expansion strips is not suitable for production, either, due to the high cost and the elaborate calibration.

Significantly more common are, due to their comparably easily measurable auxiliary quantities, the Aachen method (Kotitschke: The dynamic wheels weight of motor vehicles; its measurement and its influential factors, RWTH Aachen, 1957) and the intersecting-forces method (Tiemann: "Investigations to the brake behavior of automobile with ABS on uneven street under special consideration of the influence of the oscillation mute, progress-reports VDI Row 12 nr.s 204, VDI-publishing house, 1994). In the Aachen method, the normal wheel force $F_z$ is computed from the proportionate vertical acceleration $\ddot{z}_{B,V}$, in the following text called partial vertical body acceleration, the proportionate mass of the vehicle body (quarter vehicle) $m_{B,V}$, and the vertical wheel acceleration $\ddot{z}_W$ with the proportionate wheel mass of a wheel $m_{Wz}$ (see FIG. 1):

$$F_z = m_{B,V} \cdot \ddot{z}_{B,V} + m_{Wz} \cdot \ddot{z}_W \quad (1)$$

The intersecting-forces method evaluates the spring stroke $D_z$ of a spring 2 and the vertical wheel acceleration $\ddot{z}_W$ for the determination of the dynamic normal wheel force $F_z$ (see FIG. 1):

$$F_z = c_{Bz} \cdot \Delta z + d_{Bz} \cdot \Delta \dot{z} + m_{Wz} \cdot \ddot{z}_W \quad (2)$$

Both methods require the vertical wheel acceleration $\ddot{z}_w$. Accelerometers for the measurement of this quantity, however, are expensive due to the high accelerations occurring at the wheel and to the extreme environmental influences.

SUMMARY OF THE INVENTION

It is an object of the invention to identify, for the use in driving dynamics control, a method and a device for the determination of a vertical acceleration of a wheel of a vehicle that is simple and cost-effective to realize.

This objective is achieved with the features of the independent claims. Dependent claims are directed to preferred embodiments of the invention.

According to the invention, a first determination device can determine a spring acceleration of a spring which is mounted between the body and the wheel and loaded in the vertical direction by the vehicle body. A second determination device can determine a partial vertical body acceleration. A control unit can further determine a vertical acceleration of a wheel (vertical wheel acceleration) by adding the spring stroke acceleration from the first determination unit and the partial vertical body acceleration from the second determination unit. The thus determined vertical wheel acceleration can then be used e.g. for the determination of the normal wheel force. In this invention, an expensive sensor arrangement for the detection of the vertical wheel acceleration can therefore be eliminated, and the results of the determination of the vertical wheel acceleration according to the invention reflect very accurately the actual comparison test results.

Various embodiments of the invention are now exemplarily explained with respect to the attached schematic drawings. Additional benefits and advantages of the present invention will become apparent to those skilled in the art to which this invention relates from the subsequent description of the preferred embodiment and the appended claims, taken in conjunction with the accompanying drawing.

BRIEF DESCRIPTION OF THE DRAWINGS

The drawings that will now be briefly described are incorporated herein to illustrate preferred embodiments of the invention and a best mode presently contemplated for carrying out the invention.

DETAILED DESCRIPTION OF THE INVENTION

Figure 1:
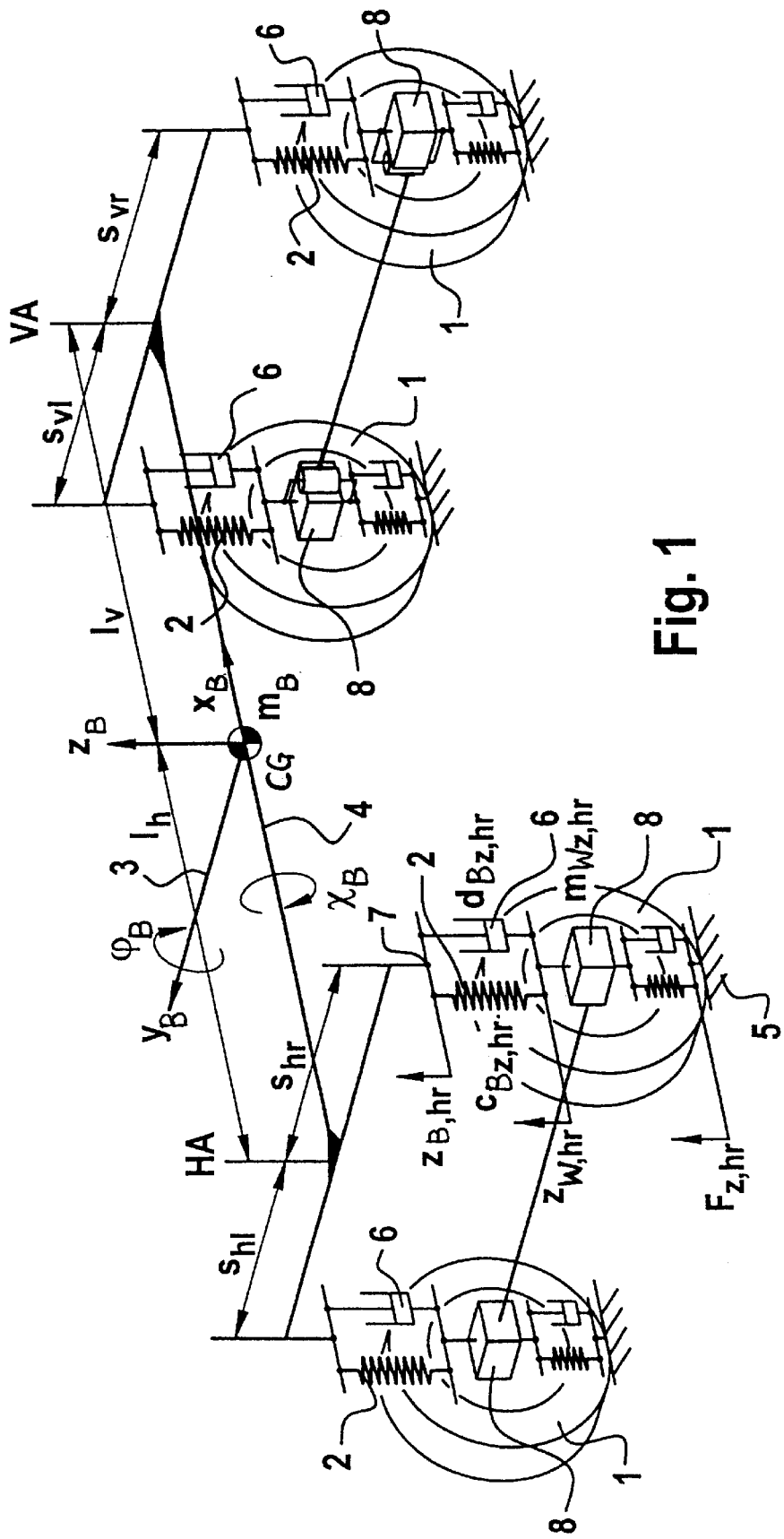
FIG. 1 is a schematic drawing of a simplified vehicle model.

In FIG. 1, a simplified vehicle model is shown for the illustration of the quantities used in the invention. The model consists of two wheels 1 attached to the rear axle HA and two wheels 1 attached to the front axle VA. The wheels 1 may each be connected to the respective axle by means of a parallel arrangement of a spring 2 and a damping member 6.

Further, a center of gravity CG of the mass of the vehicle body $m_B$ is present. The body can consist of all of the vehicle components without the wheels 1, shares of the springs 2, shares of the damping members 6, and other suspension parts. The longitudinal direction $x_B$ can be pre-determined by the roll axis 4, the lateral direction $y_B$ by the pitch axis 3 of the body. The pitch axis 3 can include a non-depicted shift in longitudinal direction $l_{CP}$ and/or vertical direction $h_{CP}$ relative to the center of gravity CG. The roll axis can include a non-depicted shift in lateral direction $l_{CR}$ and/or in vertical direction $h_{CR}$ relative to the center of gravity CG.

The distance from the front axle VA to the pitch axis 3 is labeled as $l_v$ in FIG. 1, the distance of the rear axle HA to the pitch axis 3 as $l_h$. The distance of the respective wheel suspension point on the body 7 to the roll axis 4 is labeled as $s_{vl}$, $s_{vr}$, $s_{hl}$, or $s_{hr}$, respectively, where in this document subscript vl stands for front left, subscript vr for front right, subscript hl for rear left, and subscript hr for rear right. A rotation of the body about the pitch axis 3, i.e. the pitch angle, is labeled as $\phi_B$, a rotation of the body about the roll axis 4, i.e. the roll angle, is labeled as $\chi_B$.

The mass of a wheel $m_{Wz}$ is joined into the respective element 8. The spring and damping members outlined beneath the respective element 8 symbolize the respective spring and damping properties of the wheels which, however, may remain unconsidered in this invention. The quantity $z_{B,hr}$ identifies the proportional vertical acceleration component of the body $z_{B,V}$ at the rear wheel. This applies accordingly to the components for the other wheels $z_{B,hl}$, $z_{B,vr}$, and $z_{B,vl}$, which, for simplification purposes, are not shown.

According to the invention, the spring acceleration $\Delta\ddot{z}$ of the spring 2, loaded in vertical direction by the body, is determined. This can occur separately for every wheel. Also, a partial vertical body acceleration $\ddot{z}_{B,V}$ effecting the body is determined, which can be effective at the wheel suspension point 7. This can as well occur separately for each wheel. Afterwards, the spring stroke acceleration $\Delta\ddot{z}$ and the partial vertical body acceleration $\ddot{z}_{B,V}$ are added up for each wheel to a respective vertical wheel acceleration $\ddot{z}_W$:

$$\ddot{z}_W = \Delta\ddot{z} + \ddot{z}_{B,V} \tag{3}$$

The spring stroke acceleration $\Delta\ddot{z}$ can, for instance, be determined by twice differentiating the respective spring stroke $\Delta z$, which itself can for instance be determined by measuring. The partial vertical body acceleration $\ddot{z}_{B,V}$ can, for instance, be determined in dependence on the vertical body acceleration $\ddot{z}_B$ in the center of gravity CG and/or of the angular pitch acceleration $\phi_B$ and/or of the angular roll acceleration $\chi_B$, in particular by means of the following equation:

$$\ddot{z}_{B,vl} = \Delta\ddot{z}_{vl} + \ddot{z}_B - (l_v + l_{CP}) \cdot \ddot{\phi}_B + s_{vl} \cdot \ddot{\chi}_B \tag{4}$$

$$\ddot{z}_{B,vr} = \Delta\ddot{z}_{vr} + \ddot{z}_B - (l_v + l_{CP}) \cdot \ddot{\phi}_B + s_{vr} \cdot \ddot{\chi}_B$$

-continued $$\ddot{z}_{B,hl} = \Delta\ddot{z}_{hl} + \ddot{z}_B - (l_h + l_{CP}) \cdot \ddot{\phi}_B + s_{hl} \cdot \ddot{\chi}_B$$

$$\ddot{z}_{B,hr} = \Delta\ddot{z}_{hr} + \ddot{z}_B - (l_v + l_{CP}) \cdot \ddot{\phi}_B + s_{hr} \cdot \ddot{\chi}_B$$

The vertical body acceleration $\ddot{z}_B$ in the center of gravity CG can for example be determined in dependence on the spring strokes $\Delta z_{vl}$, $\Delta z_{vr}$, $\Delta z_{hl}$, $\Delta z_{hr}$ for the respective wheels 1 and/or of the spring stroke velocities $\Delta\dot{z}_{vl}$, $\Delta\dot{z}_{vr}$, $\Delta\dot{z}_{hl}$, $\Delta\dot{z}_{hr}$, in particular according to the following equation:

$$\ddot{z}_B = -\frac{1}{m_A} \cdot (c_{Bz,vl} \cdot \Delta z_{vl} + d_{Bz,vl} \cdot \Delta\dot{z}_{vl} + c_{Bz,vr} \cdot \Delta z_{vr} + \tag{5}$$
$$d_{Bz,vr} \cdot \Delta\dot{z}_{vr} + c_{Bz,hl} \cdot \Delta z_{hl} + d_{Bz,hl} \cdot \Delta\dot{z}_{hl} +$$
$$c_{Bz,hr} \cdot \Delta z_{hr} + d_{Bz,hr} \cdot \Delta\dot{z}_{hr}) - g$$

Here, g represents the gravitational acceleration component, $c_{B,vl}$, $c_{B,vr}$, $c_{B,hl}$, $c_{B,hr}$ the respective spring constants of the springs 2, and $d_{B,vl}$, $d_{B,vr}$, $d_{B,hl}$, $d_{B,hr}$ the respective damping constants of the damping members 6. Equation (5) applies in particular to non-inclined road surfaces. For the case of an inclined road surface, equation (5) can for instance be adapted in a known manner by means of corresponding angular components.

The angular pitch acceleration $\ddot{\phi}_B$ can for instance be determined in dependence on the spring strokes $\Delta z_{vl}$, $\Delta z_{vr}$, $\Delta z_{hl}$, $\Delta z_{hr}$ and/or of the corresponding spring stroke velocities $\Delta\dot{z}_{vl}$, $\Delta\dot{z}_{vr}$, $\Delta\dot{z}_{hl}$, $\Delta\dot{z}_{hr}$ and/or of the longitudinal body acceleration $\ddot{x}_B$, in particular according to the following equation:

$$\ddot{\phi}_B = -\frac{1}{\theta_y} \cdot ((c_{Bz,hl} \cdot \Delta z_{hl} + d_{Bz,hl} \cdot \Delta\dot{z}_{hl} + c_{Bz,hr} \cdot \Delta z_{hr} + d_{Bz,hr} \cdot \tag{6}$$
$$\Delta\dot{z}_{hr}) \cdot (l_h - l_{CP}) - (c_{Bz,vl} \cdot \Delta z_{vl} + d_{Bz,vl} \cdot \Delta\dot{z}_{vl} + c_{Bz,vr} \cdot$$
$$\Delta z_{vr} + d_{Bz,vr} \cdot \Delta\dot{z}_{vr}) \cdot (l_v + l_{CP}) + \ddot{x}_B m_B \cdot (h_{CG} - h_{PA}) + m_B g l_{CP})$$

with the mass moment of inertia about the pitch axis $\theta_y$. The angular roll acceleration $\chi_B$ can for instance be determined in dependence on the can for instance be determined in dependence on the spring strokes $\Delta z_{vl}$, $\Delta z_{vr}$, $\Delta z_{hl}$, $\Delta z_{hr}$ and/or of the corresponding spring stroke velocities $\Delta\dot{z}_{vl}$, $\Delta\dot{z}_{vr}$, $\Delta\dot{z}_{hl}$, $\Delta\dot{z}_{hr}$ and/or of the lateral body acceleration $\ddot{y}_B$, in particular according to the following equation:

$$\ddot{\chi}_B = -\frac{1}{\theta_x} \cdot ((c_{Bz,vl} \cdot \Delta z_{vl} + d_{Bz,vl} \cdot \Delta\dot{z}_{vl}) \cdot s_{vl} + \tag{7}$$
$$(c_{Bz,hl} \cdot \Delta z_{hl} + d_{Bz,hl} \cdot \Delta\dot{z}_{hl}) \cdot s_{hl} -$$
$$(c_{Bz,vr} \cdot \Delta z_{vr} + d_{Bz,vr} \cdot \Delta\dot{z}_{vr}) \cdot s_{vr} -$$
$$(c_{Bz,hr} \cdot \Delta z_{hr} + d_{Bz,hr} \cdot \Delta\dot{z}_{hr}) \cdot s_{hr} -$$
$$\ddot{y}_B m_B \cdot (h_{CG} - h_{RA}) + m_B g l_{CR})$$

with the mass moment of inertia about the roll axis $\theta_x$. Equation (6) and equation (7) apply in particular to non-inclined road surfaces. For the case of an inclined road surface, they can as well be adapted in a known manner by means of corresponding angular components.

Figure 2:
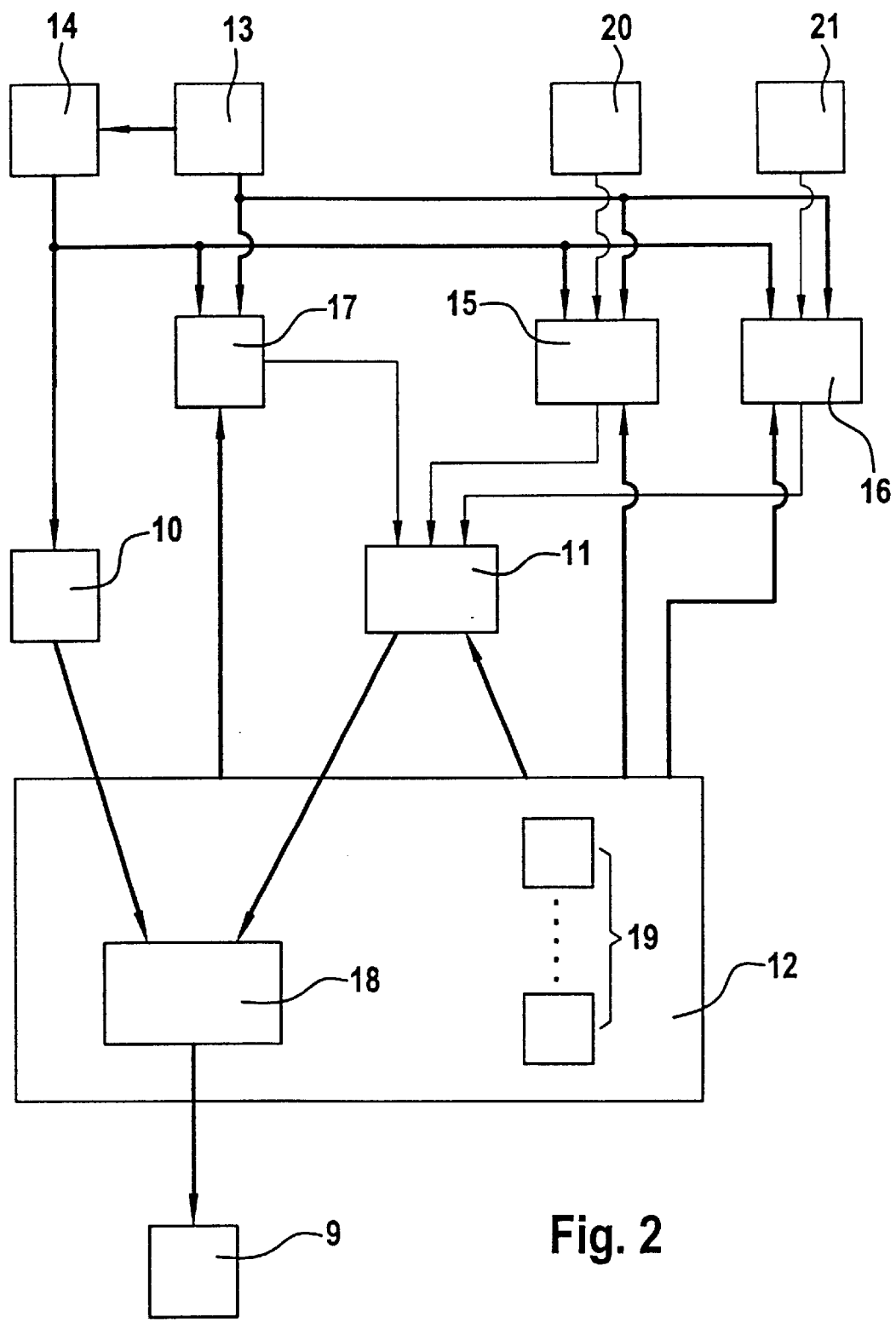
FIG. 2 is charts showing a block diagram of an embodiment of the device according to the invention.

In FIG. 2, a block diagram of an embodiment of the invention is shown, which determines one or more vertical wheel accelerations $\ddot{z}_{W,vl}$, $\ddot{z}_{W,vr}$, $\ddot{z}_{W,hl}$, $\ddot{z}_{W,hr}$ and passes them to a driving dynamics control or monitoring system. A first sensor arrangement 13 determines one or more spring strokes $\Delta_{z,vl}$, $\Delta z_{vr}$, $\Delta z_{hl}$, $\Delta z_{hr}$ in a known manner, e.g. via spring stroke sensors, and passes these on to a differentiating device 14. The differentiating device 14 determines from these one or more corresponding spring stroke velocities $\Delta \dot{z}_{vl}$, $\Delta \dot{z}_{vr}$ $\Delta \dot{z}_{h}$, $\Delta \dot{z}hr$, which it passes on to the first determination device 10. The first determination device 10, which may as well be a differentiating device, determines from these one or more spring stroke accelerations $\Delta \ddot{z}_{vl}$, $\Delta \ddot{z}_{vr}$ $\Delta \ddot{z}_{h}$, $\Delta \ddot{z}_{hr}$ for forwarding to the control unit 12.

A second sensor arrangement 20 determines the longitudinal body acceleration $\ddot{x}_B$ and passes it on to a third determination device 15. The longitudinal body acceleration $\ddot{x}_B$ does not need to be measured directly but may as well be computed from other vehicle quantities, e.g. from the total braking force. The third determination device 15 receives as further input signals the spring strokes $\Delta z_{vl}$, $\Delta z_{vr}$, $\Delta z_{hl}$, $\Delta z_{hr}$ from the first sensor arrangement and the spring stroke velocities $\Delta \dot{z}_{vl}$, $\Delta \dot{z}_{vr}$ $\Delta \dot{z}_{h}$, $\Delta \dot{z}_{hr}$ from the differentiating device 14 and determines therefrom the angular pitch acceleration $\phi_B$, which it passes on to a second determination device 11.

A third sensor arrangement 21 determines the lateral body acceleration $\ddot{y}_B$ and passes it on to a fourth determination device 16. The lateral body acceleration $\ddot{y}_B$ does not need to be measured directly but may as well be computed from other vehicle quantities. The fourth determination device 16 receives as further input signals the spring strokes $\Delta z_{vl}$, $\Delta z_{vr}$, $\Delta z_{hl}$, $\Delta z_{hr}$ from the first sensor arrangement and the spring stroke velocities $\Delta \dot{z}_{vl}$, $\Delta \dot{z}_{vr}$ $\Delta \dot{z}_{h}$, $\Delta \dot{z}_{hr}$ from the differentiating device 14 and determines therefrom the angular roll acceleration $\chi_B$, which it passes on to a second determination device 11.

The second sensor arrangement 20 and/or the third sensor arrangement may for instance contain known accelerometers. The third and/or fourth determination device 15, 16 may as well contain suitable known accelerometers but may also determine the respective angular acceleration by differentiating the respective angle of rotation and/or the respective angular velocity. The further parameters required for the determination of the angular accelerations are received by the third and fourth determination device 15, 16 from the control unit 12, which contains storage elements 19 for storing for instance parameters for the execution, such as the gravitational acceleration g, the masses $m_B$, $m_W$, the distances $l_{CP}$, $l_{CR}$, etc.

A fifth determination device 17 receives as input quantities the spring strokes the spring strokes $\Delta z_{vl}$, $\Delta z_{vr}$, $\Delta z_{hl}$, $\Delta z_{hr}$ from the first sensor arrangement and the spring stroke velocities $\Delta \dot{z}_{vl}$, $\Delta \dot{z}_{vr}$ $\Delta \dot{z}_{h}$, $\Delta \dot{z}_{hr}$ from the differentiating device 14 as well as further required parameters from the control unit 12 and determines therefrom the vertical body acceleration $\ddot{z}_B$, which it passes to the second determination device 11. The fifth determination device 17 may as well contain an accelerometer for the detection of the vertical body acceleration $\ddot{z}_B$, in which case, for instance, it would be able to do without the mentioned input quantities. The second determination device determines from its input quantities and further required parameters, which it receives from the control unit 12, one or more partial vertical body accelerations $\ddot{z}_{B,vl}$, $\ddot{z}_{B,vr}$, $\ddot{z}_{B,hl}$, $\ddot{z}_{B,hr}$, which it passes on to the control unit 12.

Control unit 12 contains an adder 18, which adds, for each wheel separately, the respective partial vertical body accelerations $\ddot{z}_{B,vl}$, $\ddot{z}_{B,vr}$, $\ddot{z}_{B,hl}$, $\ddot{z}_{B,hr}$ from the second determination device and the respective spring stroke accelerations $\Delta \ddot{z}_{vl}$, $\Delta \ddot{z}_{vr}$, $\Delta \ddot{z}_{hl}$, $\Delta \ddot{z}_{hr}$ according to equation (3) and thus determines the respective vertical wheel accelerations $\ddot{z}_{W,vl}$, $\ddot{z}_{W,vr}$, $\ddot{z}_{W,hl}$, $\ddot{z}W,hr$ for output to the driving dynamics control 9.

The thick connecting lines shown in FIG. 2 indicate that, through these, multiple quantities can be transmitted. This may occur for instance in parallel lines or as well serially in one line. The remaining thinly drawn connecting lines indicate that here, for instance, only one quantity is transferred. This may be designed differently in other embodiments. Between the individual devices or sensor arrangements, there can be provided further connections, in particular connections to the control unit which may for instance, control the operation of all devices/sensor arrangements. The control unit and/or the other devices/sensor arrangements may for instance communicate with each other through a data and/or control bus. Besides, it is conceivable that the inventive device is integrated into the driving dynamics control and/or monitoring system 9.

The embodiment shown in Fig. 2 has the advantage that only the spring strokes $\Delta z_{vl}$, $\Delta z_{vr}$, $\Delta z_{hl}$, $\Delta z_{hr}$ and the longitudinal $\ddot{x}_B$ and lateral $\ddot{y}_B$ body acceleration need to be sensorily detected or measured, respectively, and the other quantities can be derived from these. The few quantities to be detected can be accurately detected by means of sensors already partially or completely present, whereby costs can be saved. The spring strokes $\Delta z_{vl}$, $\Delta z_{vr}$, $\Delta z_{hl}$, $\Delta z_{hr}$ are already detected in modern vehicles in series production, e.g. for headlight distance control, load condition recognition or chassis control. The utilization of accelerometers in the center of gravity CG is significantly more cost-efficient than the utilization of wheel accelerometers. They require a small measuring range, and their installation occurs, for instance, in the inner vehicle space. In vehicles equipped with an electronic stability program (ESP), a lateral body accelerometer is already present.

The longitudinal body acceleration $\ddot{x}_B$ can also be determined by once differentiating the vehicle velocity determined from the wheel speeds or also directly from the wheel speeds or also from the braking forces. By this means, a further sensor can be eliminated.

For eliminating the sensors for detecting the longitudinal $\ddot{x}_B$ and lateral $\ddot{y}_B$ body acceleration, the design of the vertical dynamic properties can be made use of. When designing the springs and damping members, these are selected in a way that the natural body frequency ranges at a low frequency, e.g. 1 to 2 Hz. The natural frequency of the system wheel mass/tire, in contrast, ranges, depending on the wheel mass, the tire type, the inner tire pressure, etc., at a higher frequency, e.g. at 10 to 15 Hz. By way of high-pass filtering the spring stroke $\Delta z$ or the spring stroke acceleration $\Delta \ddot{z}$ with a filter cut-off frequency that can range above the natural body frequency and below the natural frequency of the system wheel mass/tire, e.g. at 4 to 8 Hz, the for instance unknown vertical wheel acceleration $\ddot{z}_W$ can thus be filtered out of the spring stroke acceleration $\Delta \ddot{z}$ according to the following equation:

$$\ddot{z}_W = f_{high-pass}(\Delta \ddot{z})$$

Instead of high-pass filtering, also band-pass filtering can be used, where the lower cut-off frequency corresponds to the above-mentioned filter cut-off frequency and the upper cut-off frequency ranges above the natural frequency of the system wheel mass/tire, e.g. at 18 Hz.

A further application of the invention consists in that, in presence of an accelerometer for the detection of the vertical body acceleration $\ddot{z}_B$, the damping constants $d_{B,vl}$, $d_{B,vr}$, $d_{B,hl}$, $d_{B,hr}$ can be estimated by means of equation (5) with known estimation methods, e.g. a method of the "least squares" (LS). The estimation method can be simplified under the assumption that the spring constants $c_{B,vl}$, $c_{B,vr}$, $c_{B,hl}$, $c_{B,hr}$ do not change over the lifetime of the vehicle. The body mass $m_a$ can for instance be determined after closing the doors from the statical spring compression at the four wheel suspensions.

Figure 3:
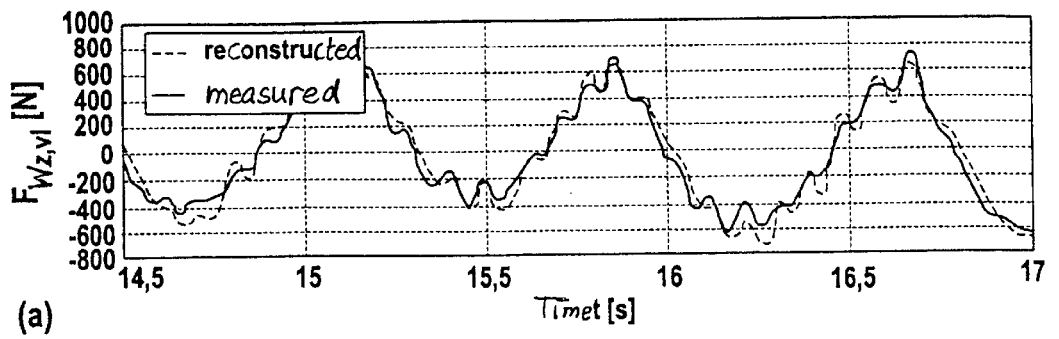
FIG. 3 shows a comparison of results pursuant to the method according to the invention (re-constructed) with comparison measurements (measured).
Figure 3:
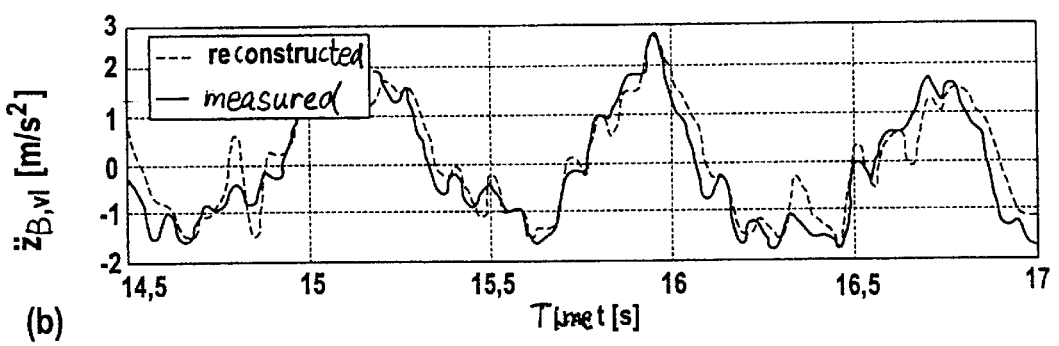
Figure 3:
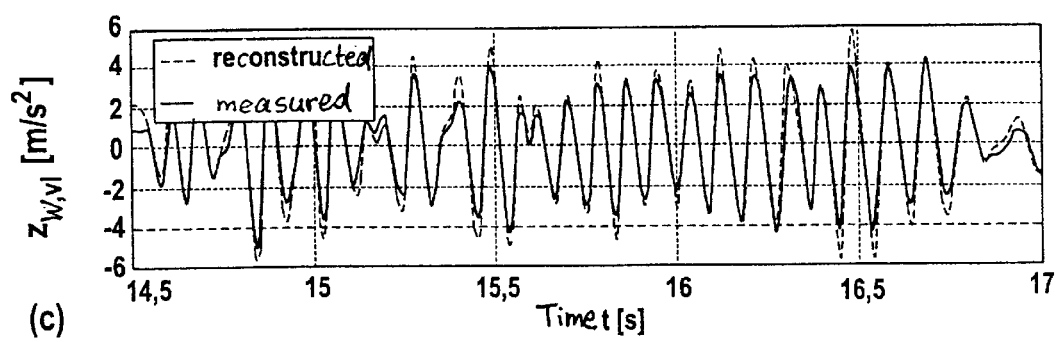
Figure 3:
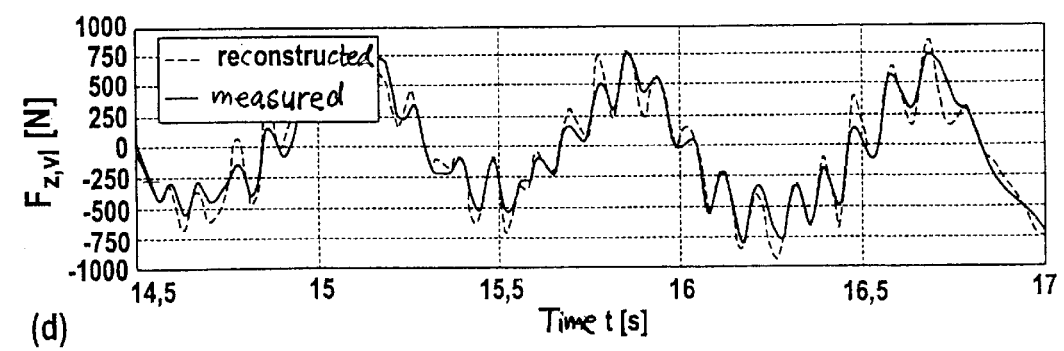

To illustrate the accuracy of the invention, FIG. 3 shows a comparison of results according to the inventive method (re-constructed) with comparison measurements (measured) for the spring damping force $F_{Wz,vl}$ determined by means of the characteristic spring and damping curve from the spring stroke (a), for the partial vertical body acceleration $\ddot{z}_{B,vl}$ (b), for the vertical wheel acceleration $\ddot{z}_{W,vl}$ (c), and for the dynamic normal wheel force $F_{z,vl}$ (d), each for the left front wheel. For the determination of the normal wheel force $F_{z,vl}$, the intersecting-forces method according to equation 2 was applied. Due to the good conformance of the intermediate quantities, for instance, also the dynamic normal wheel force $F_{z,vl}$ could be determined with a high accuracy.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words and description rather than of limitation.

What is claimed is:

1. A method for the determination of a vertical acceleration ($\ddot{z}_W$) of a wheel of a vehicle for use in a driving dynamics control or monitoring system comprising:
   a. determining a spring stroke acceleration ($\Delta\ddot{z}$) of a spring loaded in vertical direction by the body of the vehicle and installed between the body and the wheel;
   b. determining a partial vertical body acceleration ($\ddot{z}_{B,V}$) effective on the body; and
   c. adding the spring stroke acceleration ($\Delta\ddot{z}$) and the partial vertical body acceleration ($\ddot{z}_{B,V}$), in order to obtain the vertical acceleration ($\ddot{z}_W$).

2. A method according to claim 1, wherein a vertical body acceleration in the center of gravity ($\ddot{z}_B$) is determined and the partial vertical body acceleration ($\ddot{z}_{B,V}$) is determined in dependence on the vertical body acceleration in the center of gravity ($\ddot{z}_B$).

3. A method according to claim 1, wherein an angular pitch acceleration $\varphi_B$ is determined and the partial vertical body acceleration ($\ddot{z}_{B,V}$) is determined in dependence on the angular pitch acceleration $\varphi_B$.

4. A method according to claim 1, wherein an angular roll acceleration $\chi_B$ is determined and the partial vertical body acceleration ($\ddot{z}_{B,V}$) is determined in dependence on the angular roll acceleration $\chi_B$.

5. A method according to claim 2, wherein the spring strokes of all wheels of the vehicle ($\Delta z_{vl}$, $\Delta z_{vr}$, $\Delta z_{hl}$, $\Delta z_{hr}$) and/or the corresponding spring stroke velocities ($\Delta \dot{z}_{vl}$, $\Delta \dot{z}_{vr}$, $\Delta \dot{z}_{hl}$, $\Delta \dot{z}_{hr}$) are determined and wherein the vertical body acceleration in the center of gravity $\ddot{z}_B$ and/or the angular pitch acceleration $\varphi_B$ and/or the angular roll acceleration $\chi_B$ are determined in dependence on the spring strokes of the wheels ($\Delta z_{vl}$, $\Delta z_{vr}$, $\Delta z_{hl}$, $\Delta z_{hr}$) and/or the corresponding spring stroke velocities ($\Delta \dot{z}_{vl}$, $\Delta \dot{z}_{vr}$, $\Delta \dot{z}_{hl}$, $\Delta \dot{z}_{hr}$).

6. A method according to claim 3, wherein the longitudinal body acceleration in the center of gravity $\ddot{x}_B$ of the vehicle is determined and the angular pitch acceleration $\varphi_B$ is determined in dependence on the longitudinal body acceleration in the center of gravity $\ddot{x}_B$.

7. A method according to claim 4, wherein the lateral body acceleration in the center of gravity $\ddot{y}_B$ of the vehicle is determined and the angular roll acceleration $\chi_B$ is determined in dependence on the lateral body acceleration in the center of gravity $\ddot{y}_B$.

8. A method according to claim 1, wherein the vertical acceleration of the left front wheel ($\ddot{z}_{W,vl}$), of the right front wheel ($\ddot{z}_{W,vr}$), of the left rear wheel ($\ddot{z}_{W,hl}$), and of the right rear wheel ($\ddot{z}_{W,hr}$) are determined according to the equations $$\ddot{z}_{B,vl} = \Delta\ddot{z}_{vl} + \ddot{z}_B - (l_v + l_{CP}) \cdot \ddot{\varphi}_B + s_{vl} \cdot \ddot{\chi}_B$$

$$\ddot{z}_{B,vr} = \Delta\ddot{z}_{vr} + \ddot{z}_B - (l_v + l_{CP}) \cdot \ddot{\varphi}_B + s_{vr} \cdot \ddot{\chi}_B$$

$$\ddot{z}_{B,hl} = \Delta\ddot{z}_{hl} + \ddot{z}_B - (l_h + l_{CP}) \cdot \ddot{\varphi}_B + s_{hl} \cdot \ddot{\chi}_B$$

$$\ddot{z}_{B,hr} = \Delta\ddot{z}_{hr} + \ddot{z}_B - (l_h + l_{CP}) \cdot \ddot{\varphi}_B + s_{hr} \cdot \ddot{\chi}_B$$

with $$\ddot{z}_B = -\frac{1}{m_A} \cdot (c_{Bz,vl} \cdot \Delta z_{vl} + d_{Bz,vl} \cdot \Delta \dot{z}_{vl} + c_{Bz,vr} \cdot \Delta z_{vr} + d_{Bz,vr} \cdot \Delta \dot{z}_{vr} + c_{Bz,hl} \cdot \Delta z_{hl} + d_{Bz,hl} \cdot \Delta \dot{z}_{hl} + c_{Bz,hr} \cdot \Delta z_{hr} + d_{Bz,hr} \cdot \Delta \dot{z}_{hr}) - g$$

$$\ddot{\varphi}_B = -\frac{1}{\theta_y} \cdot ((c_{Bz,hl} \cdot \Delta z_{hl} + d_{Bz,hl} \cdot \Delta \dot{z}_{hl} + c_{Bz,hr} \cdot \Delta z_{hr} + d_{Bz,hr} \cdot \Delta \dot{z}_{hr}) \cdot (l_h - l_{CP}) - (c_{Bz,vl} \cdot \Delta z_{vl} + d_{Bz,vl} \cdot \Delta \dot{z}_{vl} + c_{Bz,vr} \cdot \Delta z_{vr} + d_{Bz,vr} \cdot \Delta \dot{z}_{vr}) \cdot (l_v + l_{CP}) + \ddot{x}_B m_B \cdot (h_{CG} - h_{PA}) + m_B g l_{CP})$$

$$\ddot{\chi}_B = -\frac{1}{\theta_x} \cdot ((c_{Bz,vl} \cdot \Delta z_{vl} + d_{Bz,vl} \cdot \Delta \dot{z}_{vl}) \cdot s_{vl} + (c_{Bz,hl} \cdot \Delta z_{hl} + d_{Bz,hl} \cdot \Delta \dot{z}_{hl}) \cdot s_{hl} - (c_{Bz,vr} \cdot \Delta z_{vr} + d_{Bz,vr} \cdot \Delta \dot{z}_{vr}) \cdot s_{vr} - (c_{Bz,hr} \cdot \Delta z_{hr} + d_{Bz,hr} \cdot \Delta \dot{z}_{hr}) \cdot s_{hr} - \ddot{y}_B m_B \cdot (h_{CG} - h_{RA}) + m_B g l_{CR})$$

wherein
  $m_B$ is the body mass of the vehicle;
  g is the gravitational acceleration;
  $\Delta\ddot{z}_{vl}$, $\Delta\ddot{z}_{vr}$, $\Delta\ddot{z}_{hl}$, $\Delta\ddot{z}_{hr}$ are the respective spring stroke accelerations front left, front right, rear left, and rear right;
  $\ddot{x}_B$ is the longitudinal body acceleration in the center of gravity (CG);
  $\ddot{y}_B$ is the lateral body acceleration in the center of gravity (CG);
  $\ddot{z}_B$ is the vertical body acceleration in the center of gravity (CG);
  $l_{vl}$, $l_{vr}$, $l_{hl}$, $l_{hr}$ are the respective distances in longitudinal direction from the wheel to the center of gravity (CG);
  $l_{CP}$ is the distance of the center of gravity (CG) to the pitch axis;
  $l_{CR}$ is the distance of the center of gravity (CG) to the roll axis;
  $\varphi_B$ is the angular pitch acceleration;
  $\chi_B$ is the angular roll acceleration;
  $s_{vl}$, $s_{vr}$, $s_{hl}$, $s_{hr}$ are the respective distances in lateral direction from the wheel to the center of gravity(CG);
  $h_{CG}$, $h_{PA}$, $h_{RA}$ are the respective distances in vertical direction from the center of gravity (CG), from the pitch axis, and from the roll axis to the road surface;

$c_{B,vl}$, $c_{B,vr}$, $c_{B,hl}$, $c_{B,hr}$ are the respective spring constants of the springs;

$d_{B,vl}$, $d_{B,vr}$, $d_{B,hl}$, $d_{B,hr}$ are the respective damping constants of damping members, one of which is arranged in parallel to each spring; and $\theta_x$, $\theta_y$ are the respective mass moments of inertia of the body about the longitudinal or lateral axis, respectively.

9. A method for the determination of a vertical acceleration ($\ddot{z}_W$) of a wheel of a vehicle for use in a driving dynamics control or monitoring system, comprising:

a. determining a spring stroke acceleration ($\Delta\ddot{z}$) of a spring loaded in vertical direction by the body of the vehicle and installed between the body and the wheel;

b. determining a spring stroke acceleration ($\Delta\ddot{z}$) of the spring based on the detected spring stroke; and c. filtering the spring stroke acceleration ($\Delta\ddot{z}$) with a high-pass filter, whose filter cut-off frequency ranges above the natural body frequency and below the natural frequency of the system wheel mass/tire.

10. A device for the determination of a vertical acceleration ($\ddot{z}_W$) of a wheel of a vehicle for use in driving dynamics control, comprising:

a first sensor arrangement for detecting a spring stroke of a spring loaded in vertical direction by the body of the vehicle and installed between the body and the wheel;

a first determination device for the determination of a spring stroke acceleration ($\Delta\ddot{z}$) based on the spring stroke;

a second determination device for the determination of a partial vertical body acceleration ($\ddot{z}_{B,V}$); and a control unit, which adds the spring stroke acceleration ($\Delta\ddot{z}$) and the partial vertical body acceleration ($\ddot{z}_{B,V}$) in order to obtain the vertical acceleration ($\ddot{z}_W$) and passes the vertical acceleration ($\ddot{z}_W$) for further processing to the driving dynamics control or monitoring system.

11. A method according to claim 1, further comprising the step of filtering the spring stroke acceleration ($\Delta\ddot{z}$) with a high-pass filter, whose filter cut-off frequency ranges above the natural body frequency and below the natural frequency of the system wheel mass/tire.

* * * * *

UNITED STATES PATENT AND TRADEMARK OFFICE
CERTIFICATE OF CORRECTION

PATENT NO. : 6,819,979 B1
DATED : November 16, 2004
INVENTOR(S) : Ralf Schwarz et al.

It is certified that error appears in the above-identified patent and that said Letters Patent is hereby corrected as shown below:

Title page,
Item [57], ABSTRACT,

Line 11, delete "$(z\ddot{z}_w)$" and substitute -- $(\ddot{z}_w)$ -- in its place.

Lines 12-13, delete "and passes the vertical wheel acceleration $(\ddot{z}_w)$".
Line 18, after "reflect very" insert -- accurately the --.

Column 7,
Lines 30-41, delete (paragraphs a., b., c.), and insert the following:
-- a. detecting a spring stroke of a spring loaded in vertical direction by the body of the vehicle and installed between the body and the wheel;

b. determining a spring stroke acceleration $(\Delta\ddot{z})$ of the spring based on the detected spring stroke;
c. determining a partial vertical body acceleration $(\ddot{z}_{B,V})$ effective on the body; and d. adding the spring stroke acceleration $(\Delta\ddot{z})$ and the partial vertical body acceleration $(\ddot{z}_{B,V})$, in order to obtain the vertical acceleration $(\ddot{z}_w)$ .--.

Column 9,
Lines 11-13, delete (paragraph a.) and insert the following:
-- a. detecting a spring stroke of a spring loaded in vertical direction by the body of the vehicle and installed between the body and the wheel; --.

Signed and Sealed this

Twenty-third Day of August, 2005

JON W. DUDAS
*Director of the United States Patent and Trademark Office*